Patented Sept. 2, 1930

1,774,507

UNITED STATES PATENT OFFICE

OTTO ERNST AND HEINRICH LANGE, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF CONCENTRATING AQUEOUS CHLORACETALDEHYDE SOLUTIONS

No Drawing. Application filed October 9, 1928, Serial No. 311,413, and in Germany October 28, 1927.

The present invention relates to a new process of concentrating aqueous chloracetaldehyde solutions.

The process of preparing chloracetaldehyde from vinyl chloride and chlorine as described in our co-pending U. S. patent application Ser. No. 311,12 consists in introducing vinyl chloride and chlorine in a gaseous state into water without using a catalyst and with or without cooling, it being advantageous to mix the compound thoroughly.

We have now found that in cases where isolation of the chloracetaldehyde is necessary or desirable, the chloracetaldehyde can be obtained from the aqueous hydrochloride solution by a single distillation and directly in a concentration of about 70–80%, by increasing the concentration of hydrogen chloride contained in the reaction mixture to approximately 20% before the distillation. By using for this distillation a suitable column and causing the vapors of the high-percent chloracetaldehyde to pass behind the column through a drying apparatus over a layer of calcium chloride heated to 100° C., the chloracetaldehyde can immediately be obtained from the diluted aqueous hydrochloride solution in a pure state by a single distillation. In this case 85–90% of the chloracetaldehyde contained in the original solution are obtained in a pure state. The residue of 10–15% is expelled without the use of a column. It is obtained as a thin hydrochloride solution and introduced into the next following operation for the distillation of the reaction mixture. The increase of the concentration of the hydrogen chloride contained in the reaction mixture may be effected by introducing hydrogen chloride gas, by adding fuming hydrochloric acid or by introducing sodium chloride or another chloride and an equivalent quantity of sulfuric acid.

The following example serves to illustrate our invention, but it is not intended to limit it thereto:

32 litres each of chlorine gas and gaseous vinyl chloride are conducted within 4 hours simultaneously, but through separate conducting pipes, into 2 liters of water in a high column. In order to effect a continuous and thorough mixing of the ingredients, a weak current of nitrogen is introduced. The column is cooled with ice water and protected by some covering against the penetration of light. After the expiration of 4 hours the solution contains about 70% of the theory of chloracetaldehyde (relatively to the quantity of vinyl chloride introduced). In the reaction product the concentration of the hydrogen chloride is increased to a strength of 80% and distilled. After about one fifth of the initial volume of the reaction liquor has distilled over, the distillation is interrupted. The distillate, now containing about 80% of chloracetaldehyde, is obtained in a pure state by repeated distillation, as a hydrate of chloracetaldehyde. In order to prepare chloracetaldehyde of 100% strength, part of the first running is distilled in such a manner that the vapor of the chloracetaldehyde, after it has traversed the column, passes over a layer of calcium chloride, heated to 100° C. In the receiver pure, anhydrous chloracetaldehyde is condensed.

We claim:

1. In a process for concentrating aqueous chloracetaldehyde solutions by distillation in a column the step which consists in making the aqueous chloracetaldehyde solution strongly acid with hydrogen chloride before starting the distillation.

2. In a process for concentrating aqueous chloracetaldehyde solutions by distillation in a column the step which consists in increasing the concentration of the hydrogen chloride contained in the aqueous chloracetaldehyde solution to about 20% before starting the distillation.

3. In a process for concentrating aqueous chloracetaldehyde solutions by distillation in a column the steps which consist in increasing the concentration of the hydrogen chloride contained in the aqueous chloracetaldehyde solution to about 20% before the distillation and then conducting the distillation gases through a drying apparatus.

4. In a process for concentrating aqueous chloracetaldehyde solutions by distillation in a column the step which consist in increasing the concentration of the hydrogen chloride contained in the aqueous chloracetaldehyde solution to about 20% before starting the distillation and then conducting the distillation gases over calcium chloride heated to 100° C In testimony whereof we have hereunto set our hands.

OTTO ERNST.
HEINRICH LANGE.